July 1, 1958 C. H. SEALOCK 2,840,945
LIVE BAIT CASTER
Filed July 10, 1956

INVENTOR.
CARLTON H. SEALOCK
BY
McMorrow, Berman + Davidson
ATTORNEYS

United States Patent Office 2,840,945
Patented July 1, 1958

2,840,945

LIVE BAIT CASTER

Carlton H. Sealock, Rome, Ga.

Application July 10, 1956, Serial No. 596,901

1 Claim. (Cl. 43—41.2)

This invention relates to an improved live bait casting device for dropping into the water a live minnow or the like during the retrieving phase of a casting operation.

The main object of the present invention is to provide a generally superior live bait caster of this kind which is more efficient and reliable in action, and can be made in a serviceable and attractive form at relatively low cost.

Other objects will appear from the following description and the annexed drawings, in which like reference characters designate like parts throughout the several views, and wherein.

Figure 1:
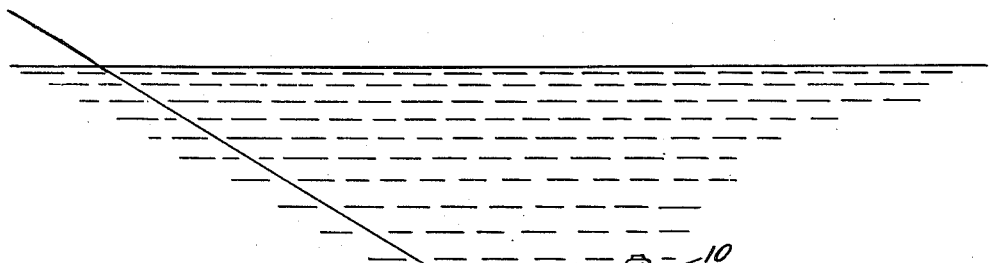
Figure 1 is a schematic view showing a device in accordance with the present invention in use, in a retrieving action of an associated fishing line.
Figure 2:
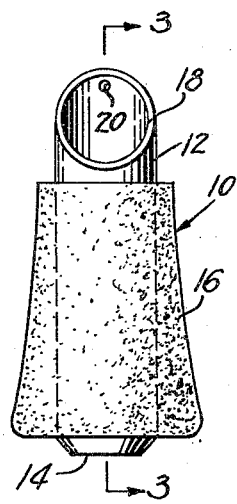
Figure 2 is a front elevational view of the device per se on an enlarged scale.

The illustrated live bait caster comprises a relatively thin-walled plain cylindrical, vertically elongated bait enclosing tube 12 whose lower end is completely closed, as indicated at 14. Tube 12 has circumposed and secured thereon a vertically elongated, relatively thick-walled sleeve 16 of cork or other buoyant material having a larger lower end 17 positioned at the lower end of the tube, and a smaller upper end 19 which is near to and spaced below the upper end of the tube 12. The sleeve 16 has an external longitudinally concaved outer surface 21 which progressively increases in diameter from its lower end 17 to its upper end 19. The tube 12 terminates at its upper end in an edge which is bevelled at an angle of approximately 45 degrees to the axis of the tube. In closely spaced relation to the upper extremity of the upper edge 18 of the tube 12 is a line-attaching aperture 20.

A fishing line 22 is loosely and slidably engaged through a loop 23 formed on one end of a leader 24 connected at its other end to the device 10 through the opening 20, and the end of the fishing line is connected at a sinker 26, to which is connected a leader 27 which has thereon a hook on which is impaled the bait, shown as a minnow M.

Figure 3:
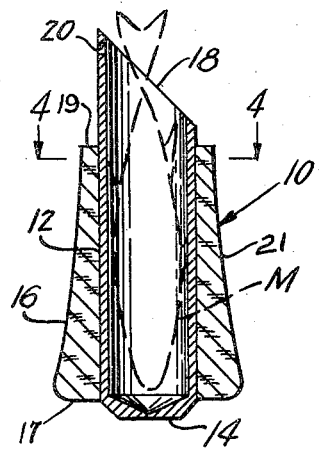
Figure 3 is a transverse vertical section on line 3—3 of Figure 2, an inserted bait fish being shown in dotted lines.
Figure 4:
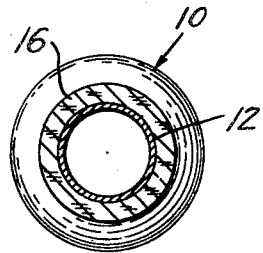
Figure 4 is a horizontal section on line 4—4 of Figure 3.

In use a minnow is inserted in tube 12, head down as shown in Figure 3. Thereafter, when the device is cast, the closed lower end thereof, which is heavier than the open upper end thereof when the device is in the air, and which is free of connection to the leader 24, will hit the water first.

As soon as the device enters the water, and is submerged to even a slight extent, it will immediately invert and assume the position shown in Figure 1 and permit the bait to drop out and swim free of the device at a substantial distance therefrom. Inversion of the device is produced by the greater buoyancy at the larger lower end 17 of the sleeve 16 and the closed lower end of the tube 12, which gives the lower end of the device greater overall buoyancy and causes the device to float upside down in the water, and by the lateral pull of the leader 24 on the upper end of the device. Further, the pull of the leader 24 on the longer side of the beveled end of the tube 12 results in the device, most usually, turning to the position shown in Figure 1, so that the open end of the tube, which opens laterally as well as axially thereof due to the beveled formation of open end of the tube, and so that the longer side of the open end of the tube protects the bait as the device is retrieved and facilitates movement of the bait fish out of the tube.

It is believed apparent that the invention is not necessarily confined to the specific use or uses thereof described above since it may be utilized for any purpose to which it may be suited. Nor is the invention limited to the specific construction illustrated and described, since such construction is only intended to be illustrative of the principles in construction that may be permitted within the scope of the appended claim.

What is claimed is:

In a live bait caster, an elongated live bait receiving tube having a closed lower end and an open upper end, fishing line securing means on said upper end, an elongated buoyant sleeve circumposed on and secured to said tube, said sleeve being tapered and having a smaller end terminating close to and spaced from said open end and a larger end terminating at the closed end of the tube, said sleeve having a concave outer surface which extends between said smaller and larger ends.

References Cited in the file of this patent

UNITED STATES PATENTS

| | | |
|---|---|---|
| 1,128,205 | White | Feb. 9, 1915 |
| 2,292,743 | Cordry | Aug. 11, 1942 |
| 2,554,318 | Waldrip | May 22, 1951 |
| 2,607,152 | Kubiak | Aug. 19, 1952 |